(12) United States Patent
Peiker

(10) Patent No.: US 7,280,656 B2
(45) Date of Patent: Oct. 9, 2007

(54) HOLDER FOR AN ELECTRONIC DEVICE

(76) Inventor: Andreas Peiker, Max-Planck-Strasse 32, Friedrichsdorf (DE)

(*) Notice: Subject to any disclaimer, the term of this patent is extended or adjusted under 35 U.S.C. 154(b) by 365 days.

(21) Appl. No.: 10/487,413

(22) PCT Filed: Aug. 23, 2002

(86) PCT No.: PCT/DE02/03135

§ 371 (c)(1),
(2), (4) Date: Feb. 23, 2004

(87) PCT Pub. No.: WO03/019803

PCT Pub. Date: Mar. 6, 2003

(65) Prior Publication Data

US 2004/0206872 A1  Oct. 21, 2004

(30) Foreign Application Priority Data

Aug. 23, 2001 (DE) ................ 101 40 379

(51) Int. Cl.
*H04M 1/00* (2006.01)

(52) U.S. Cl. ............ 379/446; 379/455; 455/575.1

(58) Field of Classification Search ........... 379/428.04, 379/441, 428.01, 447, 449, 450, 454, 455, 379/420.04, 446; 455/575.9, 90.3, 569.1, 455/569.2, 575.1; 296/37.8
See application file for complete search history.

(56) References Cited

U.S. PATENT DOCUMENTS

| | | | |
|---|---|---|---|
| 5,493,703 A | 2/1996 | Yamashita | |
| 6,208,734 B1 | 3/2001 | Ortscheid et al. | |
| 6,269,258 B1 * | 7/2001 | Peiker | 455/569.2 |
| 6,336,699 B1 * | 1/2002 | Sarkissian et al. | 347/33 |
| 2002/0032041 A1 * | 3/2002 | Hirai et al. | 455/557 |
| 2002/0115480 A1 * | 8/2002 | Huang | 455/573 |

FOREIGN PATENT DOCUMENTS

| | | |
|---|---|---|
| DE | 195 38 249 | 6/1996 |
| DE | 198 35 017 | 2/2000 |
| DE | 200 14 806 | 12/2000 |
| EP | 1 033 287 | 9/2000 |
| WO | WO95/28789 | 10/1995 |

* cited by examiner

*Primary Examiner*—Curtis Kuntz
*Assistant Examiner*—P L Dabney
(74) *Attorney, Agent, or Firm*—Venable LLP; Robert Kinberg; Ryan M. Flandro

(57) ABSTRACT

The invention relates to a holder (1) for an electronic device (6), in particular a mobile telephone (6), having a mount (3), which is hinged on a base element (2) such that it can pivot, for the mobile telephone (6). In this case, an adapter (4) is arranged between the mount (3) and the mobile telephone (6) and is designed for electrical, electronic and/or mechanical matching of the mobile telephone (6) to the mount (3).

20 Claims, 2 Drawing Sheets

HOLDER FOR AN ELECTRONIC DEVICE

CROSS-REFERENCE TO RELATED APPLICATIONS

This Application is a National Stage Application of International Application No. PCT/DE02/03135, filed Aug. 23, 2002, which claims the benefit of German Patent Application No. 101 40 379.8, filed Aug. 23, 2001.

BACKGROUND

1. Field of the Invention

The invention relates to a holder for an electronic device.

2. Related Art

A holder such as this is known from DE 196 52 826 A1. This holder has a base element on which a mount is hinged, which can be pivoted away from the base element by means of spring force. The mount is intended to hold a communication unit, one end of which is pushed onto it. Contact is made with the communication unit via a plug connector which is inserted into the mount. A holding apparatus such as this has the disadvantage that matching of the holding apparatus to mobile telephones which are currently being marketed or will be marketed in the future, in terms of the shape of the mobile telephones and the interface to the mobile telephone, is in many cases possible only by means of a different mount. The replacement of a mount is complicated, since it is necessary to modify the pivoting mechanism of the holder for this purpose.

SUMMARY OF THE INVENTION

The invention is based on the object of developing the holder for an electronic device, which allows the holder to be matched from widely differing electronic devices without having to modify the holder itself.

The holder according to the invention has an adapter which can be inserted between the mount and the mobile telephone and is intended for electrical, electronic and/or mechanical matching of the mount and mobile telephone to one another. This means that it is possible to use it for widely differing electronic devices and mobile telephones without any physical change to the mount or the base element, since the adapter allows the mount to be matched to the shape of the electronic device and to the interface of the electronic device. The matching process is carried out simply by plugging the adapter onto the mount, and this can thus be done without any problems even by those who are unskilled.

One advantageous embodiment of the subject matter of the invention provides for the mount to be pivoted together with the adapter with respect to the base element about a rotation axis which is essentially horizontal or runs transversely with respect to the longitudinal axis and parallel to the upper face of the mobile telephone. In consequence, the adapter and the mobile telephone which is held in the adapter are pivoted into the viewing direction of the operator when they are arranged in the center console or in the cockpit of a motor vehicle, and can thus be seen well in all pivoting positions.

A further advantage is that the mount and the adapter can be fixed to one another via a holding means. This ensures that the adapter and the mount, which form a functional unit, are reliably held on one another during daily use and a deliberate action by the user is required to separate them from one another. In particular, provision is made for the adapter and the mount to be connected to one another temporarily via at least one screw connection.

It is particularly advantageous for the adapter to essentially clasp the rear face of the mobile telephone. In consequence, the mobile telephone is optimally supported by the adapter, while at the same time allowing operation of all the pushbuttons on the front face of the mobile telephone, and an unimpeded view of the display on the mobile telephone.

The invention furthermore proposes that the adapter and the mount be equipped with electrical and/or optical contacts, in order to allow communication between the adapter and/or the mount and/or a radio telephone.

The invention also provides for the mount to be connected to the adapter and/or to the mobile telephone in order to interchange data by means of a radio link. This means that there is no need for any mechanical contacts. Alternatively, provision is made for the radio link to be provided for the transmission of data and speech signals between the mobile telephone and the motor vehicle, and to carry antenna signals via a mechanical contact.

The invention also provides for the adapter to be formed from one or more parts. An integral adapter represents a particularly simple, easy-to-handle, component. A multipart adapter allows matching to a different mobile telephone, and thus reuse of a part of the adapter, possibly by replacement of a single part of the adapter.

The invention furthermore provides for a spring element or a drive, in particular an electric motor drive, to be arranged between the mount element and the base element, in consequence allowing movement from a lying position, in which the mount rests on the base element, to a tilted position, in which the mount is at an angle of about 5° to 45° to the base element. The mount is preferably held in the lying position and/or in the tilted position by means of mechanical and/or electromechanical latching elements.

One particular embodiment provides for the adapter to be used together with the mobile telephone as a telephone unit, which can be separated from the mount. A separation capability such as this allows confidential calls to be made, since the telephone unit can be used like a handset. In order to provide this convenience function, provision is also made for the adapter to have a loudspeaker and a microphone which, in particular, are arranged on a lower face of the adapter, facing away from the mobile telephone. This embodiment makes it possible to optimally match the loudspeaker and the microphone to the situation in a motor vehicle.

Finally, the invention provides for the mechanical latching element which holds the mount in the lying position on the base element to be in the form of a so-called push-push mechanism. This means that it is possible to manually select between the lying position and the tilted position of the mount without any externally visible levers or knobs whatsoever being required on the holder. The push-push mechanism is operated intuitively. Starting with a mount that is held in the lying position, the mount is pushed down smoothly in the direction of the base element to release the mount from the lying position, so that the drive raises it to the tilted position. The mount is returned from the tilted position to the lying position by pushing down or pivoting the mount onto the base element. As soon as the lying position is reached, the push-push mechanism holds the mount firmly on the base element once again. This process can be repeated as often as desired. The push-push mechanism in this case changes continually between the hold and release switching states.

BRIEF DESCRIPTION OF THE DRAWINGS

Further details of the invention will be described with reference to exemplary embodiments which are illustrated schematically in the drawing, in which.

DETAILED DESCRIPTION

Figure 1:
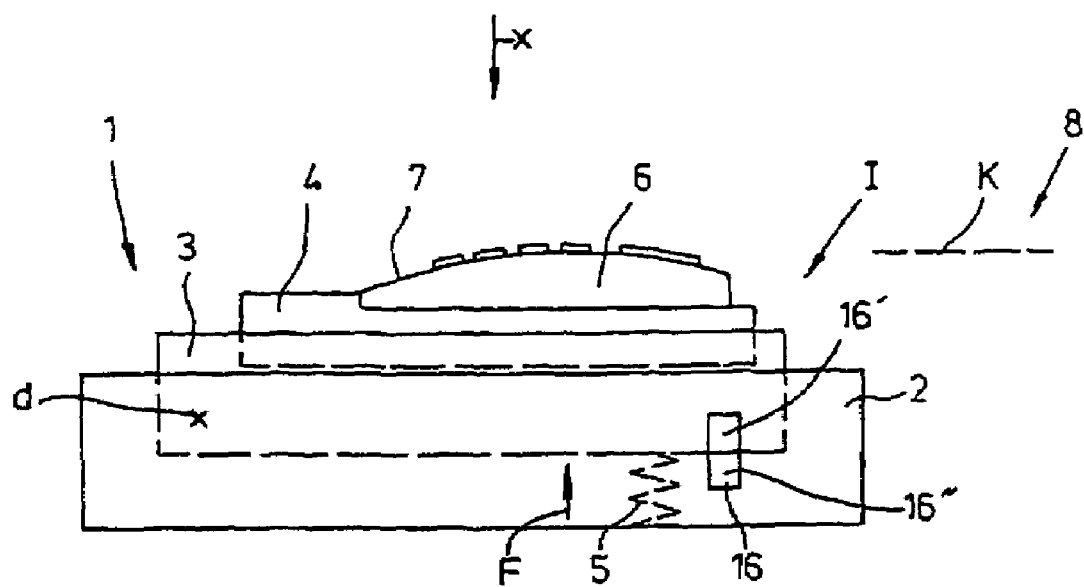
FIG. 1 shows a mount with an adapter and a radio telephone in a lying position.

FIG. 1 shows a holder 1 which comprises a base element 2, a mount 3 and an adapter 4. The base element 2 and the mount 3 are connected to one another such that they can rotate about a rotation axis d which runs at right angles to the plane of the drawing, with the mount 3 being secured via a detachable latching connection 16 against the force of a spring 5 acting in the direction of the arrow F. The adapter 4 is fixed on the mount 3 via latching connections, which are not illustrated, or via a screw connection, which is not illustrated. The mount 3 and the adapter 4 are in a lying position I. An electronic device or mobile telephone 6 is held in the adapter 4 via detachable latching connections, which are not illustrated. An upper face 7 of the mobile telephone 6 is freely accessible in the direction of the arrow x. A rear face (which is not illustrated but is opposite the upper face 7) of the mobile telephone is held completely by the adapter 4. The latching connection 16 is formed in two parts, with a first component 16' of the latching connection 16 attached to the mount 3, and a second component 16" of the latching connection 16 being connected to the base element 2. The fact that the components 16', 16" are held together means that the mount 3 is held on the base element 2 against the force of the spring 5.

Figure 2:
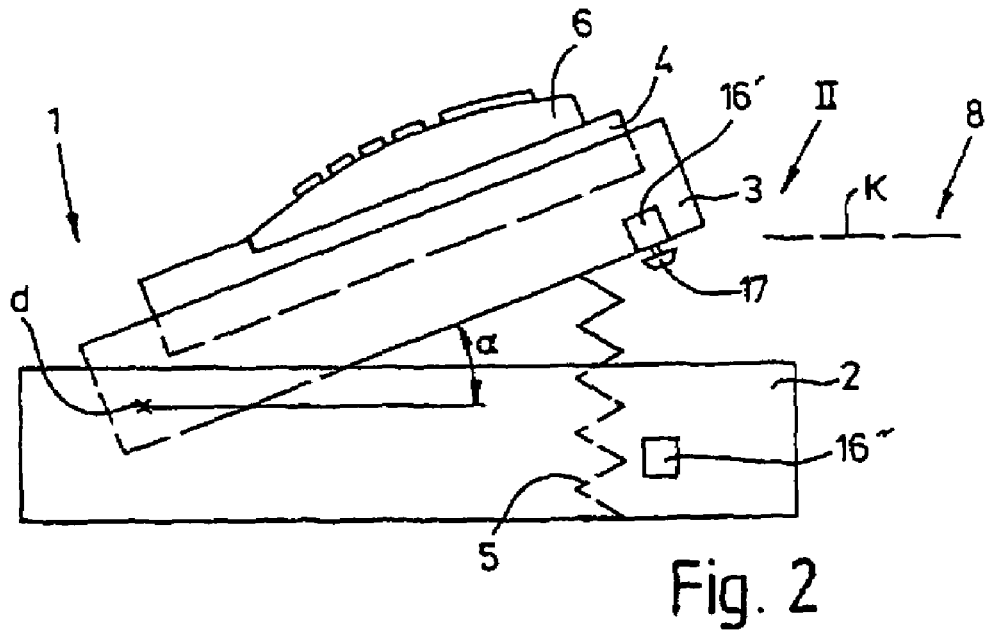
FIG. 2 shows the mount as illustrated in FIG. 1, with an adapter and a mobile telephone, in a tilted position.

FIG. 2 shows the holder 1, as illustrated in FIG. 1, in a tilted position II. In this tilted position II, the mount and the adapter 4 which is connected to it are pivoted through an angle α from the lying position I as illustrated in FIG. 1. The energy which is required for the pivoting process is applied by the spring 5. The tilted position II is used in particular to make it easier to remove the mobile telephone 6 from the holder 1 when the latter is arranged in a console 8 which has an upper edge K (indicated by a dashed line). In the tilted position II, the latching connection 16, which is in the form of a push-push mechanism, is open. The component 16" has released the component 16'. When the mount 3 is pushed down onto the base element 2, a mushroom-headed pin 17 which is part of the component 16' enters the component 16" and is gripped and held there by a mechanism which is not illustrated in any more detail.

Figure 3:
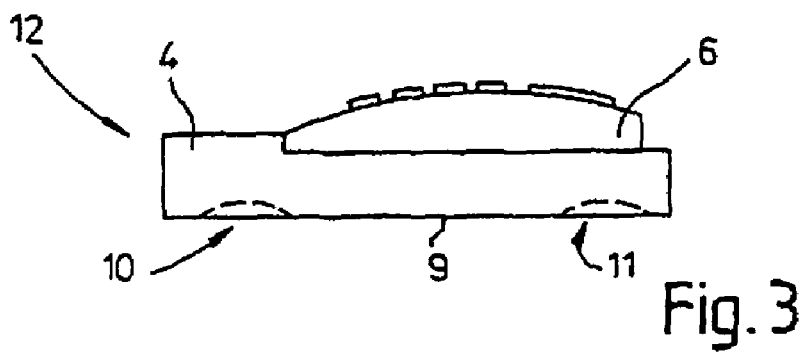
FIG. 3 shows an adapter with a mobile telephone.

FIG. 3 shows an adapter 4 which holds a mobile telephone 6 independently of the mount. The adapter has a microphone 10 and a loudspeaker 11 on a lower face 9 and, together with the mobile telephone 6, forms a telephone unit or a handset 12. According to one embodiment variant, which is not illustrated, the handset 12 is connected via a cable to a mount or base element.

In all the embodiment variants, the connection of the mobile telephone to additional components which are arranged in the holder or in the vehicle, such as a hands-free device, display device, antenna amplifier or antenna, is provided without wires and/or via contacts and cables.

Figure 4:
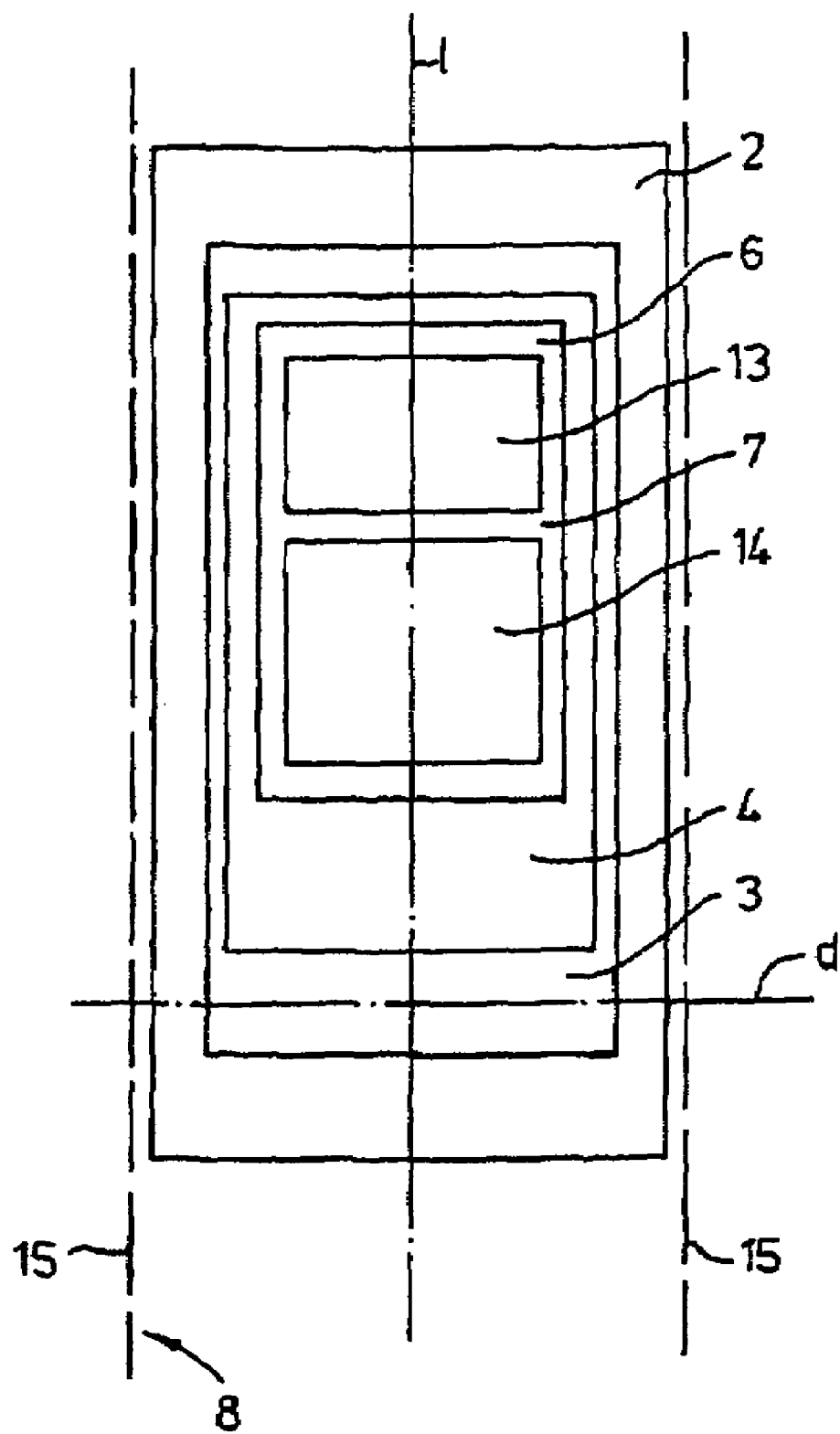
FIG. 4 shows a plan view of the arrangement as illustrated in FIG. 1.

FIG. 4 shows a plan view of the mobile telephone holder as illustrated in FIG. 1. The mobile telephone 6 has a display 13 and a keypad block 14, which is illustrated in simplified form, and is completely surrounded by the adapter 4. The adapter 4 is located in the mount 3 and, together with it, is hinged on the base element 2 such that it can rotate about the rotation axis d. The rotation axis d runs at right angles to a longitudinal axis 1 of the mobile telephone 6, and approximately parallel to the upper face 7 of the mobile telephone. Side walls 15 of the console 8 are indicated by dashed lines.

The invention is not restricted to the illustrated or described exemplary embodiments. In fact, it covers developments of the invention within the scope of the patent claims. In particular, the invention also provides for the holder according to the invention to be arranged in the roof area of a vehicle.

LIST OF REFERENCE SYMBOLS

1 Holder
2 Base element
3 Mount
4 Adapter
5 Spring
6 Mobile telephone
7 Upper face of 6
8 Console
9 Lower face of 4
10 Microphone
11 Loudspeaker
12 Telephone unit, handset
13 Display
14 Keypad block
15 Side edge of 8
16 Latching connection
16' First component of 16
16" Second component of 16
17 Mushroom-headed pin
d Rotation axis of 1
l Longitudinal axis of 6
I Lying position
II Tilted position
α Angle between 2 and 3

The invention claimed is:

1. A holder for an independently operable electronic device, the holder comprising:
    a base element,
    a mount hinged on the base element such that it can pivot between a lying position and a tilted position, and
    an adapter arranged to be removably connected to the mount between the mount and the electronic device, wherein the adapter is configured to substantially conform to the shape of the electronic device and includes means for electrical and/or electro-mechanical matching of the electronic device to the mount, and wherein the adapter is configured to detachably hold the electronic device such that the electronic device is removable from the adapter for use while the adapter remains connected to the mount.

2. The holder as claimed in claim 1, wherein the mount pivots with the adapter about an essentially horizontal rotation axis with respect to the base element.

3. The holder as claimed in claim 1, wherein the base element is adapted for arrangement in a console or cockpit of a vehicle.

4. The holder as claimed in claim 1, further including a holding mechanism connecting the mount with the adapter, wherein the holding mechanism includes one of a sprung slide, a latching connection, Velcro connection, a clamping connection, a permanent magnet, an electromagnet or a screw connection.

5. The holder as claimed in claim 1, wherein the adapter is removable from the mount and is insertable together with the electronic device into the mount.

6. The holder as claimed in claim 1, wherein the electronic device is a mobile telephone having a rear face and the adapter clasps the rear face.

7. The holder as claimed in claim 1, wherein the adapter includes at least one of electrical and optical contacts with the electronic device.

8. The holder as claimed in claim 1, wherein the adapter includes at least one of electrical and optical contacts with the mount.

9. The holder as claimed in claim 1, wherein the mount is connected to at least one of the adapter and to the electronic device via a radio link.

10. The holder as claimed in claim 1, wherein the adapter is connected to the electronic device via a radio link.

11. The holder as claimed in claim 1, wherein the adapter comprises one or more parts.

12. The holder as claimed in claim 1, further comprising a spring element arranged between the mount and the base element and arranged to push the mount from the lying position to the tilted position.

13. The holder as claimed in claim 1, further comprising one of a mechanical and electro-mechanical latching element arranged to hold the mount in the lying position.

14. The holder as claimed in claim 13, wherein the latching element is a mechanical latching element comprising a push-push mechanism adapted to release the mount from the lying position to the tilted position after a slight push on the mount in the direction of the base element when the mount is in the lying position, the push-push mechanism being further adapted to hold the mount in the lying position on the base element after the mount is pushed down from the tilted position to the lying position.

15. The holder as claimed in claim 13, wherein the latching element comprises one of a latching hook and an electromagnet.

16. The holder as claimed in claim 1, further comprising a drive to move the mount between the lying position and the tilted position.

17. The holder as claimed in claim 16, wherein the drive is an electric motor drive.

18. The holder as claimed in claim 1, wherein the adapter has a lower face and the adapter includes a loudspeaker and a microphone arranged on the lower face of the adapter.

19. The holder as claimed in claim 1, wherein the electronic device is a mobile telephone.

20. The holder as claimed in claim 1, wherein the electronic device is a radio telephone.

* * * * *